May 17, 1927.  S. K. DENNIS  1,629,153
IMPLEMENT HITCH
Filed June 16, 1924
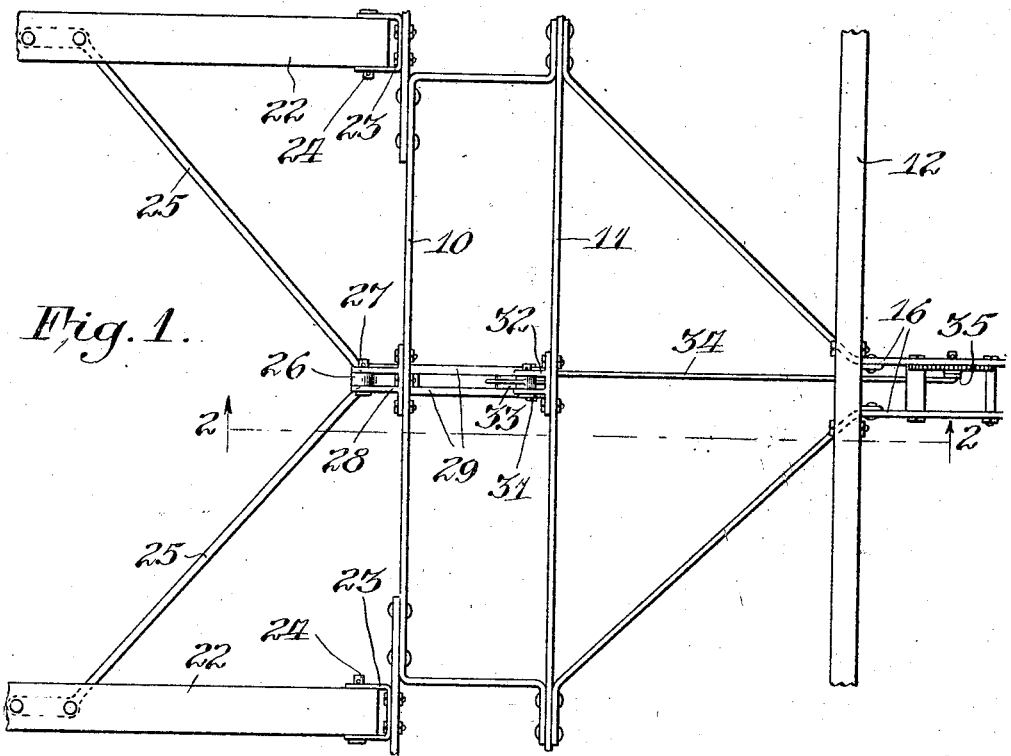
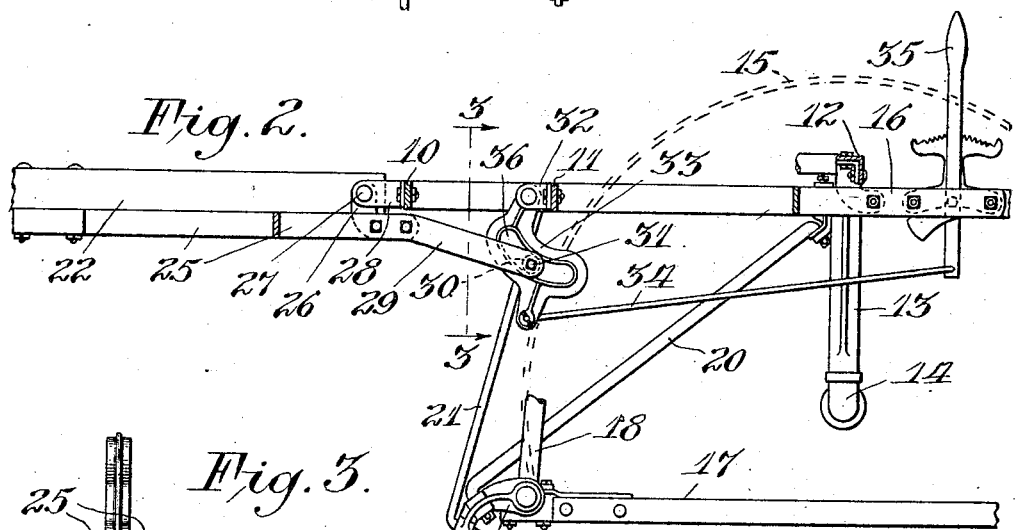
Inventor.
Samuel K. Dennis,
By R. P. Davies
Atty.

Patented May 17, 1927.

1,629,153

UNITED STATES PATENT OFFICE.

SAMUEL K. DENNIS, OF CHICAGO, ILLINOIS, ASSIGNOR TO INTERNATIONAL HARVESTER COMPANY, OF CHICAGO, ILLINOIS, A CORPORATION OF NEW JERSEY.

IMPLEMENT HITCH.

Application filed June 16, 1924. Serial No. 720,153.

This invention relates to improvements in the construction of farm implements and is more particularly directed to provision of an adjustable three-horse hitch for use with cultivators of the two-row type.

The main purpose of the invention is to provide a simple and efficient form of lever operated adjusting mechanism for obtaining angular adjustment between a draft frame or hitch and implement frame, where the two are pivotally connected for movement vertically, through the use of which the front of the implement frame, usually a straddle row cultivator, can be readily adjusted with respect to the draft frame to raise and lower the front ends of the cultivator beams to maintain them in parallel relation to the ground when the beams are adjusted to change the depth of cultivation.

This main object and other minor objects are attained by the organization and details of construction, or equivalents thereof, hereinafter more specifically described and claimed.

Referring to the drawing accompanying the specification,—

Fig. 1 is a plan view of the forward, central portion of a two-row cultivator;

Fig. 2 is a longitudinal, vertical section on the line 2—2 of Fig. 1 with one of the cultivator beams and supports therefor added; and Fig. 3 is an enlarged detail view on line 3—3, Fig. 2, of the adjustable connection between the implement frame and draft frame.

The invention is shown on the drawing as applied to a two-row cultivator, the numerals 10 and 11 designating parallel front and transverse bars of the implement frame and 12 designating an angle iron bar connecting brackets 13 in which are journaled the vertical portions of cranked spindles 14 carrying the wheels 15. Longitudinally extending frame bars 16, which carry the driver's seat, are secured beneath the bar 12 from which they diverge forwardly and are secured to the transverse bar 11, as clearly shown in Fig. 1. This frame carries the usual cultivator beams, one of which is shown at 17, Fig. 2. These beams are pivoted on the arms of the usual arches, shown in part at 18, by means of brackets 19 which are suspended from the frame by means of rods 20 and 21.

To the foregoing structure, which is merely described by way of example, as the invention may be used with any similar frame construction, there is pivoted a draft frame comprising a pair of draft members or thills 22 which are connected to the front bar 10 of the frame by means of brackets 23 and pivot pins 24. The draft members 22 are connected and braced by a pair of diagonally extending bars 25 which are connected to intermediate portions of the thills 22 and converge inwardly to a point midway between them where their converged ends are secured to a pivot member having an arm 26 which is connected by means of a pivot pin 27 to the bracket 28 on bar 10 in alignment with the pivots 24 of the thills. From their point of connection to the pivot member the bars 25 are extended rearwardly at a slight inclination downward as indicated at 29 and a roller 30 is journaled on a pin 31 connecting the ends of the bars. For cooperation with the roller 30 carried by the extension 29 there is pivoted, between ears on a bracket 32, one end of a depending cam lever 33, the lower end of which has pivoted to it a rod 34 connecting with an actuating lever 35 pivoted on the seat supporting bars 16 at a point convenient to the driver's seat. The cam lever 33 is preferably formed with a transversely extending arcuate slot 36 which receives the roller 30, the bars of extension 29 straddling the lever. The slot 36 is centered on an axis eccentric to the pivot of lever 33 and its relation to the extension 29 is such that actuation of the lever will cause angular movement between the draft frame and implement frame.

The draft frame structure above described is intended as a three-horse hitch; it being understood that the usual single trees are to be provided and that one horse will be positioned between the thills 22 and the other horses on the outer sides thereof. The thills will, therefore, be supported by the horses, and movement imparted to lever 33 through actuation of hand lever 35 will cause angular movement between the two frames on the pivots 24—27 thereby raising or lowering the front portion of the implement frame and the front ends of the beams 17, this adjustment being necessary to level the beams and compensate for any change in depth of cultivation effected by raising and lowering the rear ends of the cultivator beams which carry the cultivating tools or shovels.

It will be clear from the foregoing description that the invention provides a simple form of mechanism for effecting exact changes in adjustment between a draft and implement frame, and, while the preferred form of the invention is here disclosed, it is evident that modifications are possible without departing from the gist of the invention as defined in the following claims.

What is claimed as new is:

1. The combination with an implement frame and a draft structure pivoted together at the forward end of the implement frame for angular adjustment vertically, of means for effecting said adjustment comprising a depending lever pivoted on the frame and formed with a transversely extending cam track, means for swinging the lever, and an extension fixed relative to the draft structure having a portion in movable engagement with the cam track at a point substantially directly below the pivotal support of the lever, said extension being separately pivoted to the implement frame coaxially with the pivot of the draft structure and implement frame.

2. The combination with an implement frame and a draft structure pivoted together at the forward end of the implement frame for angular adjustment vertically, of means for effecting said adjustment comprising a depending lever pivoted on the frame and formed with an arcuate cam track, means for swinging the lever, and an extension fixed relative to the draft structure having a portion in movable engagement with the cam at a point substantially directly below the pivotal support of the lever, said extension being pivoted to the implement frame coaxially with the pivot between the implement frame and draft structure.

3. The combination with an implement frame and a draft structure pivoted together at the forward end of the implement frame for angular adjustment vertically, of means for effecting said adjustment comprising a depending lever pivoted at one end of the frame and formed with an arcuate slot intermediate its ends and eccentric to its pivot, actuating means connected to the lever, and an extension fixed relative to the draft structure engaged with the lever in said slot at a point substantially directly below the pivotal support of the lever, said extension being pivoted to the implement frame coaxially with the pivot between the implement frame and draft structure.

4. The combination with an implement frame, of a draft frame comprising a pair of draft members pivoted thereto for angular adjustment vertically, brace members extending from each member to a point of pivotal connection on the frame midway between and in alignment with the pivot points of the members, a rigid extension forming a continuation of said brace members beyond said point of pivotal connection, a lever pivoted on the frame and provided with a cam track, means for swinging the lever, and a part on said extension in movable engagement with said track.

5. The combination with an implement frame, of a draft structure pivotally related to the forward end of the implement frame and extending forwardly thereof, a bracing device fixed relative to said draft structure and having an extension offset relative to the pivotal connection of the implement frame and draft structure, said bracing device also having pivotal relation to said implement frame at a point in horizontal alinement with the axis of the pivotal connection between the draft structure and implement frame, and a depending cam lever mounted on the implement frame rearwardly of the draft structure and connected to the bracing device for vertically adjusting the implement frame.

6. The combination with an implement frame, of a draft structure pivotally related to the implement frame at the forward end of the latter, said draft structure having rigid therewith a rearward extension spaced vertically from the implement frame, said rearward extension having a part eccentric to the axis of the pivotal connection between the implement frame and draft structure, and means mounted upon the implement frame for manually effecting movement of the implement frame vertically, said means including a normally substantially upright cam lever operatively connected to the eccentric part of said rearward extension of the draft structure.

7. A device of the class described comprising, in combination, a wheel supported implement frame, a draft frame pivotally related to the implement frame, the draft frame having a member extending from the point of pivotal relationship of the frames, said member having a cam engaging part, a cam lever pivoted on the implement frame on a fulcrum located within substantially the same vertical confines as those occupied by the cam engaging part, and means for moving said cam lever to vary the angular relationship of the frames.

8. A device of the class described comprising, in combination, a wheel supported implement frame, a draft frame located forwardly of the implement frame and pivotally related to the latter, the draft frame having an extension vertically spaced relative to the implement frame and extending rearwardly beyond the point of pivotal connection of the two frames, a cam lever pivoted on the implement frame and engaging the extension of the draft frame at a position within substantially the same vertical confines as those occupied by the pivot of the cam lever, and means for swinging the lever to move the extension toward or away from the implement frame.

In testimony whereof I affix my signature.

SAMUEL K. DENNIS.